_United States Patent Office_ 3,000,028
Patented Sept. 19, 1961

3,000,028
PIPELINE CLEANING DEVICE
John C. Buie, 11418 72nd Ave., and Reginald M. Rault, 1311 75th Ave., both of Edmonton, Alberta, Canada
Filed June 3, 1958, Ser. No. 739,594
2 Claims. (Cl. 15—104.06)

Our invention relates to flow line pig-ball injectors.

In many industries pipe lines are used for conveying fluids under pressure from one place to another, and in all cases it is desirable that the flow of fluid should be free and unimpaired, both in regard to volume and also to velocity, and the relationship of these two factors to each other should be fairly constant.

When in use, these pipe lines to a greater or less degree become fouled or partially clogged, so reducing the effective area of the pipe line, and the frictional resistance to the flow of fluid or liquid through the pipe line is increased.

It thus becomes necessary to periodically clean the pipe line, and if such cleaning involves the shutting down of the pipe line, and/or the disconnecting of any parts of the pipe line, then the efficiency of the line becomes greatly impaired due to the loss of the work hours during which the line is out of commission.

The character of the fluid being conveyed through the pipe line may influence the speed and frequency of the fouling of the pipe line, and a heavy and more viscous fluid may tend to foul a pipe line quicker than a light fluid, but whatever be the characteristics of the fluids, it will be appreciated that unless the pipe line is maintained in proper serviceable condition, then monetary loss of operation of the line becomes high.

It is imperative that the cleaning operation should be conducted so that it does not put the pipe line even temporarily out of commission, and since the fluids being conveyed are under pressure, this condition will add to the difficulties of the cleaning operation as at present carried out.

We are aware that pig-balls have been used to clean pipe lines, but the introduction of the balls into the line have necessitated shutting down the line during the period of inserting the balls, and when several balls have to be used, spaced apart at even short time intervals, the cumulative effect of these stoppages result in a loss of time which is costly.

In making our invention, it was necessary to overcome the difficulties encounter in the use of ordinary pipe lines, and the following objects had to be attained to successfully solve the problem.

One of the objects of our invention is to construct a pig-ball injector which may be mounted on or incorporated in pipe line fluid conveyors, and permit of pig-balls being injected into the pipe line when found necessary or desirable, to effect internal cleaning of the pipe line without shutting down or putting the line even temporarily out of commission.

Another object of our invention is to construct a pig-ball injector which may be mounted on a pressure pipe line, and in which the pressure on the injector may be balanced with the pressure in the pipe line, and so permit of the easy manual operation of the injector to deliver pig-balls into the pipe line when desired without jarring.

A further object of our invention is to construct a pig-ball injector provided with a magazine to hold pig-balls, and from which the balls may be individually and successively injected into the pipe line whenever necessary, and during the period when the pipe line is in active use.

Still another object of our invention is to render the pig-ball injector self contained and capable of being manually operated without any other external aid.

A further object still of our invention is to permit of the magazine being loaded or reloaded without interruption of the operation of the pipe line.

Another object of our invention is to construct the pig-ball loader so that it may be used by gravity control or by a resilient control depending on the position of the magazine with relation to the injector.

Still a further object of our invention is that in addition to the use of pig-balls, a chemical solvent may be introduced into the pipe line to assist in cleaning of the line simultaneously and in conjunction with the injection of the pig-balls.

Another object of our invention is to construct a pig-ball injector which is manually operable in one direction transversely across a pressure pipe line to deliver pig-balls thereto, and when the manually operated means are released the injector is automatically retracted to a normal position lying outside of the confines of the bore of the pipe line.

A further object still of our invention is to construct the injector so that it is strong and durable and not liable to go out of repair, and in which the several parts are readily accessible for inspection.

Other objects will be made clear as the specification develops.

So that the nature of our invention will be fully understood, we have illustrated an embodiment of the same which we shall describe in detail, but we wish it to be understood that we do not limit our invention to this specific structure but reserve the right to modify the same within the scope of our appended claims without departing from the spirit of our invention.

In the drawings.

Like characters of reference refer to like parts in the several figures.

Figure 1:
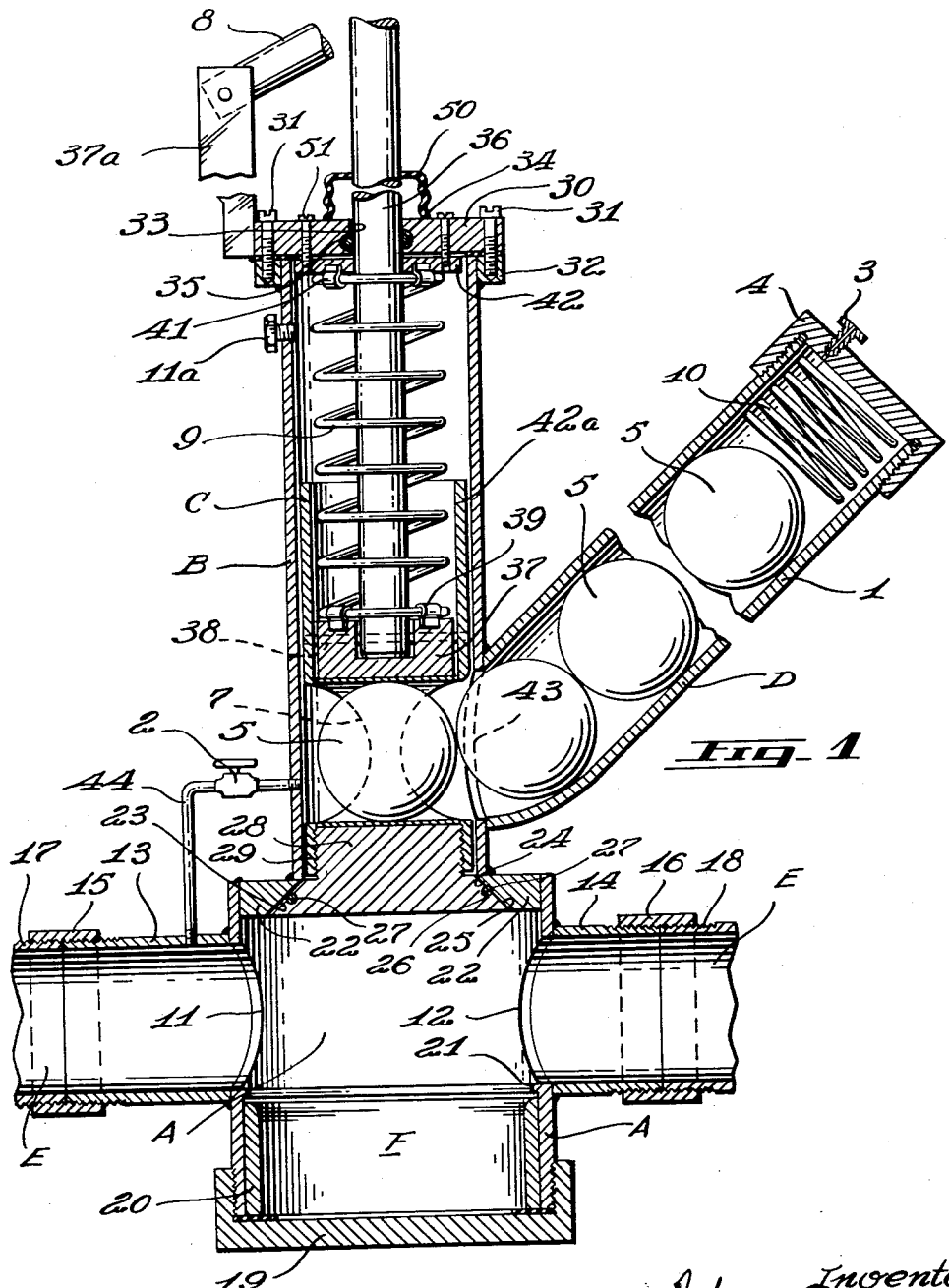
FIGURE 1 is a sectional elevation of our pig-ball injector, showing the cage positioned in registering position and in line with the magazine to receive a pig-ball therefrom.
Figure 2:
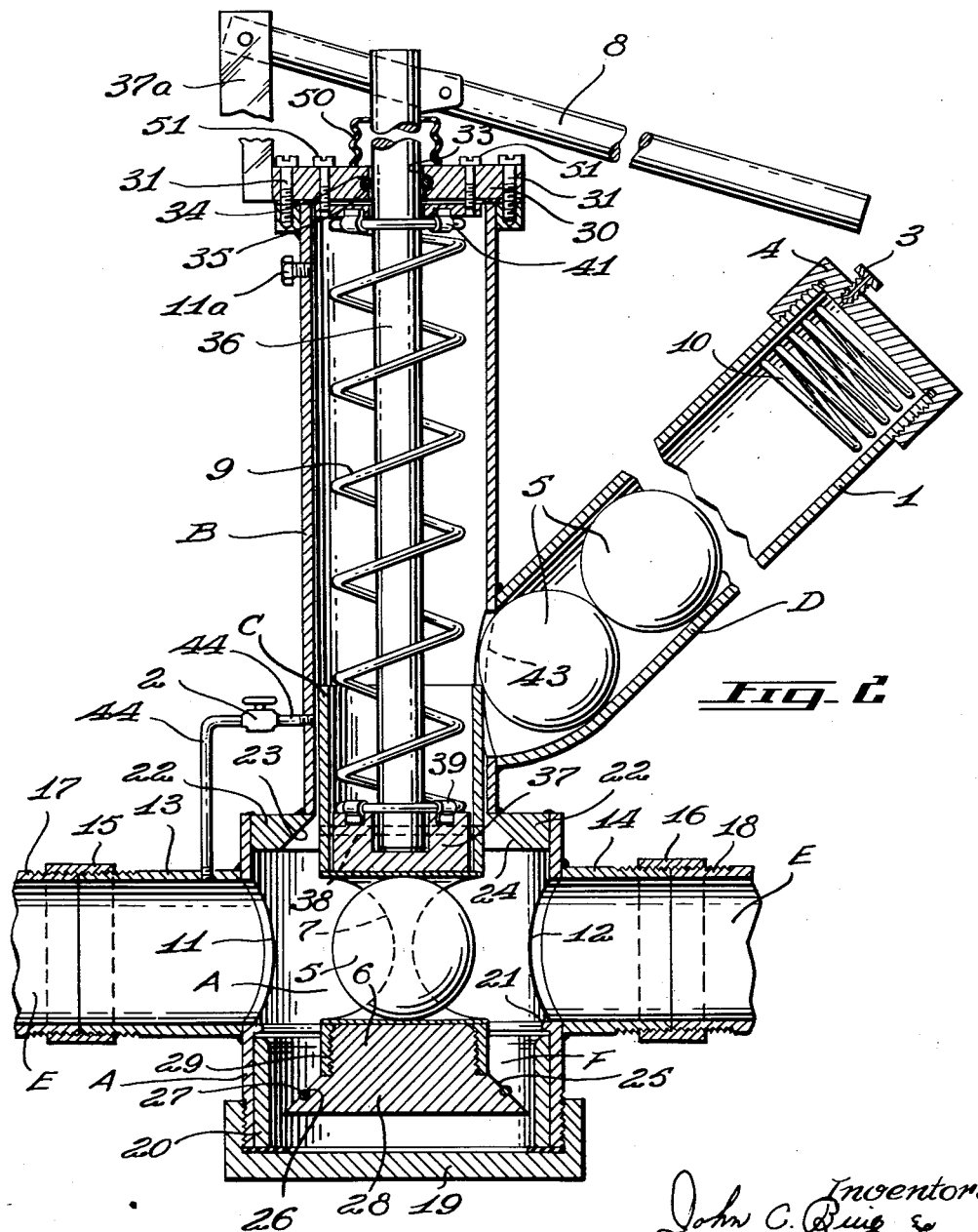
FIGURE 2 is a sectional elevation of our injector with the cage projected into the pipe line to deliver a pig-ball thereto.

Referring to the drawings, A represents a cylindrical casing to which an injector cylinder B is operatively connected, and in this cylinder B the pig-ball injector C is slidably mounted. The magazine D is connected to the cylinder B and designed to deliver pig-balls to the injector as shall be made clear hereafter.

The cylindrical casing A is provided in its peripheral wall with orifices 11 and 12 which are arranged diametrically opposite each other, and from this peripheral wall conduits 13 and 14 extend which register with the orifices 11 and 12, and the axes of the orifices and conduits are in alignment. The conduits 13 and 14 are provided with threaded ends which are connected by couplings 15 and 16 with adjacent threaded ends 17 and 18 of the pipe line E.

One end of the casing A is closed by a removable cover 19 which makes threaded engagement with the peripheral wall of the casing, and a gasket is located between the end of the casing and the cover. In the casing A a sleeve 20 is provided, the inner end of which abuts the rib 21 extending around the inner periphery of the casing. A chamber F is thus formed at the end of the casing A.

That end of the casing A remote from the cover 19 is provided with a closure wall 22 which is secured to the casing by suitable means, such as welding. The wall 22 is formed with a central aperture 23, the peripheral wall of which is bevelled to form a valve seat 24. Co-acting with the valve seat 24 is a valve 6, the peripheral wall of which is bevelled as at 25 and formed with a groove 26 with which the gasket 27 engages. That end of the valve 6 remote from the casing A is formed with a boss 28 which makes threaded engagement with a sleeve 29 which constitutes part of the injector C.

Projecting from the casing A and in longitudinal alignment with the valve 6 is a cylinder B which is connected to the casing by suitable means. The other end of this cylinder is closed by a cover 30 which is secured by set screws 31 to the flange 32 carried by the end of the cylinder B. Any suitable form of gasket may be inserted between the cover 30 and the flanged end of the cylinder B. This cover is formed with a concentric orifice 33 formed with a groove 34 in its peripheral wall, and in this groove a packing ring 35 is located.

Slidably mounted in the orifice 33 is a spindle 36, the outer end of which projects beyond the cover 30 and with this outer end a hand lever 8 co-acts. One end of the hand lever is pivoted to the bracket 37a, and the hand lever 8 is manually actuated to move the spindle 36 longitudinally through the cylinder B. It will be observed that a bellows connection 50 is provided between the spindle 36 and the cover 30, so that should any leakage of fluid take place between the spindle and the packing ring 35, this leakage will be arrested by the bellows 50.

The inner end of the spindle 36 is connected to a bracket 37 by means of a pin 38 which extends through the peripheral wall of the cup 42a and the bracket 37, and this bracket carries clips 39 arranged diametrically opposite each other, and with these clips the adjacent end of the tension spring 9 engages. This tension spring encircles the spindle 36, and the other end of the spring engages the clips 41 mounted on the bracket 42, which is secured to the cover 30 by set screws 51.

The bracket 37 is housed in and secured to the cylindrical cup 42a which is rigidly connected to or formed integral with the cage 7 which is also connected to the valve 6, and this cage is positioned intermediate of the length of the injector C.

The cylinder B is formed on its peripheral wall adjacent the valve 6 with an orifice 43 which registers with one end of the cylindrical pig-ball magazine D, which in turn is angularly disposed to and rigidly secured to the cylinder B by suitable means, such as welding. The other end of the magazine D is closed by a removable cover 4 which makes threaded engagement with the peripheral wall of the magazine D, and this cover is provided with a bleed valve 3. A suitable gasket may be inserted between the cover and the end of the magazine if found necessary.

In the cylindrical magazine D a compression spring 10 is housed, and a plurality of pig-balls 5 are located between the spring 10 and the injector cage 7.

The cylinder B is provided with an inlet orifice which is normally closed by a threaded pin 11a, and the cylinder is further connected through the tube 44 and valve 2 with the conduit 13.

By reference to the drawings it will be noted that there is a certain amount of clearance between the outer periphery of the cup 42a and the inner wall of the cylinder B, and that there is also a like clearance between the outer periphery of the sleeve 29 and the inner wall of the cylinder B and this clearance or tolerance in construction is to prevent fluid locks forming in the cylinder B, which locks would impede the operation of the injector C. An alternative to this structure would be to provide shallow longitudinal grooves in the peripheral wall of the cup 42a and the sleeve 29, but it is deemed unnecessary to illustrate or describe such grooves.

During the retraction of the injector C after delivering a pig-ball 5 to the pipe line E, any fluid between the cup 42a and the cover 30 of the cylinder acts as a shock absorber and prevents too rapid a movement of the injector C, and during this movement, the fluid escapes in filamentary form around the cup 42a and does not act as a lock.

When the pipe line E has become fouled and it is necessary to clean the same, the hand valve 2 is opened to equalize the pressure in the pipe line with the pressure in the cylinder B. The magazine D is loaded with pig-balls 5, and the pig-ball located adjacent the orifice 43 is fed into the cage 7. The operator now actuates the hand lever 8 to move the injector C longitudinally through the cylinder B, and the valve 6 enters the chamber F at the remote end of the casing A beyond the orifices 11 and 12. This will bring the injector cage 7 in registering position with the orifices 11 and 12 so that the pig-ball in the cage will enter the conduit 14, thence to the pipe line E through which it will travel to clean the interior of the pipe line. So that the cage 7 will be directly over the axial centre of the pipe line, the arc through which the hand lever is rotated may be limited by a stop (not illustrated).

After the pig-ball 5 has been delivered to the pipe line E and the operator has released the hand lever 8, the injector C is automatically retracted by the spring 9, and when the injector has reached its normal retracted position shown in FIGURE 1, then the cage 7 registers with the orifice 43 and another pig-ball 5 is delivered to the cage 7. The closing of the valve 6 on the valve seat insures that the cage 7 will always be in position relatively to the orifice 43 to receive a pig-ball from the magazine D.

The fluid pressure built up in the magazine D during this retractive movement of the injector C is released by opening the bleed valve 3 in the cover 4 of the magazine D.

When the injector C is primarily moved longitudinally through the cylinder B, there will be fluid pressure on the inner wall of the valve 6 exposed to the liquid passing through the pipe line E, but by opening the valve 2 and permitting the fluid under pressure to enter behind the valve 6, then this valve becomes balanced, and the injector C can be smoothly moved by the operation of the hand lever 8.

When the operator releases the hand lever 8, the injector C is then retracted by the tension spring 9 exerting a pull on the cylindrical cup 42a, cage 7 and the valve 6, and the bevelled peripheral wall 25 of the valve then engages the valve seat 24, and the gasket 27 forms a tight seal between the valve and valve seat.

It may be found advantageous to use a chemical solvent in conjunction with the pig-balls 5 to clean the pipe line E, and this is accomplished by removing the pin 11a from the threaded orifice in the cylinder B and delivering the required chemicals through this orifice to the cylinder. The orifice is then closed by the threaded pin 11a.

When the magazine D is empty and the injector C is in the position shown in FIGURE 1 with the valve 6 closed and the valve 2 closed, then the cover 4 may be disengaged from the magazine D to permit recharging of pig-balls without shutting down the pipe line. The spring 10 engages an adjacent pig-ball 5, and the cover is threaded on the end of the magazine D. During this reloading of the magazine D, the pipe line E is in full operation.

Also, since the operation of delivering pig-balls 5 to the pipe line E is carried out when the line is in full use and there is no shut down of the pipe line, then the efficiency of our injector will be clearly evident.

It will be noted from the above description that the casing A extends beyond the bore of the pipe line E, and forms the chamber F into which the valve 6 enters as the injector is moved transversely across the confines of the bore of the pipe line E. The valve 6 is smaller than the diameter of the chamber F, so that liquid is not trapped in this chamber when the valve 6 enters the chamber, but will escape around the peripheral edge of the valve 6, but the liquid in the chamber forms a cushion against the valve 6 and eliminates any jarring which might otherwise take place during the translatory movement of the injector C into its discharging position.

The simplicity of operation will be clearly understood when it is remembered that each cycle of operation of the injector C merely requires the operator to open the valve 2 to balance the pressure in the cylinder B with the pressure in the pipe line E, and when this equalizing of the pressure is accomplished the valve 2 is closed. The operator then actuates the hand lever 8 to move the injector C across the pipe line to deliver a pig-ball to the pipe line E, and when this is accomplished the operator releases the hand lever 8 to allow the injector C to return to its normal position to receive a pig-ball from the magazine D. The bleed valve 3 is operated when necessary. This simple operation can be carried out by any semi-skilled person without the aid of technical assistance.

The magazine D is so related to the cylinder B that our injecting device may be used on pipe lines whether they be horizontal, vertical or inclined, and the several associated parts of the device will function in a manner to give the highest efficiency irrespective of the disposition of the pipe line on which the device is used.

From the above description it will be clear that we have invented a pressure pipe line cleaning device which can be advantageously used in pipe lines which are liable to foul or become clogged, and this device is capable of being used without shutting down the pipe line, so resulting in an economical operation of cleaning the pipe line.

We claim:

1. Apparatus for inserting pig balls into a pipeline comprising, a tubular casing for disposition in and transversely of said pipeline, said casing having aligned lateral orifices and conduit coupling means associated therewith for connecting the casing in said pipeline, covers closing both ends of the casing, one of said covers having an opening therethrough defining an inwardly facing valve seat, a hollow cylinder connected at one end to said one cover about said opening and extending from the casing, an injector slidably mounted within said cylinder and passable through said opening, said injector being formed with a transverse cage having diametrically opposite openings alignable with said orifices when the injector is moved into the casing, the end of the injector nearest the casing carrying a valve normally seated on said valve seat and checking motion of the injector away from the casing, the other end of the injector being in the form of a cylindrical cup, a bracket secured within the cup, a cylinder cover closing the end of the cylinder remote from the casing, a spindle slidably mounted through the cylinder cover with its inner end secured to said bracket, a tension spring encircling the spindle and connected at its ends to the bracket and cylinder cover, manually operable lever means connected to the outer end of the spindle for moving the injector into the casing against the tension of said spring, fluid lock preventing means between the cylinder and injector, a valved pressure equalizing conduit between the cylinder and one said conduit coupling means associated with the casing orifices, and an angularly disposed pig ball magazine connected to and opening into the cylinder so as to register with said cage when said valve is seated, said magazines having a removable closure with a bleed valve means and also having spring means therein for biasing the pig balls toward the cylinder.

2. Apparatus as claimed in claim 1 in which a bellows connection is provided between the cylinder cover and the spindle passing through the cover, the valve seat being bevelled and the face of the valve bevelled and formed with an annular groove, and a gasket engaging the annular groove.

References Cited in the file of this patent

UNITED STATES PATENTS

| | | |
|---|---|---|
| 307,437 | Clay | Nov. 4, 1884 |
| 458,834 | Ireland | Sept. 1, 1891 |
| 682,985 | Gray | Sept. 17, 1901 |
| 753,597 | Long | Mar. 1, 1904 |
| 1,205,586 | Worley | Nov. 21, 1916 |
| 1,873,677 | Traver | Aug. 23, 1932 |
| 2,312,244 | Feltman | Feb. 23, 1943 |
| 2,493,504 | Roberts | Jan. 3, 1950 |
| 2,755,742 | Vincent | July 24, 1956 |
| 2,790,500 | Jones | Apr. 30, 1957 |
| 2,796,878 | Atkinson et al. | June 25, 1957 |
| 2,818,592 | Scaramucci | Jan. 7, 1958 |
| 2,893,028 | Scaramucci | July 7, 1959 |
| 2,915,422 | Stone | Dec. 1, 1959 |

FOREIGN PATENTS

| | | |
|---|---|---|
| 76,084 | Austria | Apr. 10, 1919 |